United States Patent
Lee et al.

(10) Patent No.: US 7,346,035 B2
(45) Date of Patent: Mar. 18, 2008

(54) SYSTEM AND METHOD FOR RETRANSMITTING UPLINK DATA FROM A MOBILE TERMINAL IN A SOFT HANDOVER REGION IN AN ASYNCHRONOUS CDMA MOBILE COMMUNICATION SYSTEM SERVICING AN ENHANCED UPLINK DEDICATED TRANSPORT CHANNEL

(75) Inventors: Jun-Sung Lee, Uiwang-shi (KR); Gin-Kyu Choi, Seoul (KR); Hun-Kee Kim, Seoul (KR); Kyo-Sook Shin, Suwon-shi (KR); Noh-Sun Kim, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 861 days.

(21) Appl. No.: 10/686,727

(22) Filed: Oct. 17, 2003

(65) Prior Publication Data
US 2004/0192308 A1    Sep. 30, 2004

(30) Foreign Application Priority Data
Mar. 24, 2003  (KR) .................. 10-2003-0018147

(51) Int. Cl.
*H04Q 7/00*  (2006.01)

(52) U.S. Cl. .................. 370/331; 455/442; 714/749; 714/751

(58) Field of Classification Search ................ 370/335, 370/236, 349, 394; 455/522, 442; 714/748, 714/749, 751
See application file for complete search history.

(56) References Cited

U.S. PATENT DOCUMENTS

| | | | |
|---|---|---|---|
| 6,678,249 B2 * | 1/2004 | Toskala et al. | 370/236 |
| 6,678,523 B1 * | 1/2004 | Ghosh et al. | 455/442 |
| 6,694,469 B1 * | 2/2004 | Jalali et al. | 714/748 |
| 6,704,898 B1 * | 3/2004 | Furuskar et al. | 714/751 |
| 6,842,445 B2 * | 1/2005 | Ahmavaara et al. | 370/349 |
| 6,996,763 B2 * | 2/2006 | Sarkar et al. | 714/749 |
| 7,027,420 B2 * | 4/2006 | Hamalainen | 370/335 |
| 2004/0116143 A1 * | 6/2004 | Love et al. | 455/522 |
| 2006/0198377 A1 * | 9/2006 | Kubota | 370/394 |

\* cited by examiner

*Primary Examiner*—Chi Pham
*Assistant Examiner*—Albert T. Chou
(74) *Attorney, Agent, or Firm*—Roylance, Abrams, Berdo & Goodman L.L.P.

(57) ABSTRACT

A method and system of retransmitting uplink packet data from a user equipment (UE) in a handover region to Node Bs. The UE transmits packet data to the Node Bs on an enhanced uplink dedicated transport channel (EUDCH). The Node Bs transmit to the UE first response fields indicating whether the Node Bs have received good packet data or bad packet data, and second response fields that the Node Bs received from an RNC indicating whether a radio network controller (RNC) has received good packet data or bad packet data. The UE then detects the first and second response fields and retransmits the uplink packet data according to the values of the response fields in the UE.

18 Claims, 15 Drawing Sheets

SYSTEM AND METHOD FOR RETRANSMITTING UPLINK DATA FROM A MOBILE TERMINAL IN A SOFT HANDOVER REGION IN AN ASYNCHRONOUS CDMA MOBILE COMMUNICATION SYSTEM SERVICING AN ENHANCED UPLINK DEDICATED TRANSPORT CHANNEL

PRIORITY

This application claims priority under 35 U.S.C. § 119 to an application entitled "System and Method for Retransmitting Uplink Data from Mobile Terminal in Soft Handover Region in an Asynchronous CDMA Mobile Communication System Servicing Enhanced Uplink Dedicated Transport Channel" filed in the Korean Intellectual Property Office on Mar. 24, 2003 and assigned Ser. No. 2003-18147, the contents of which are incorporated herein by reference.

BACKGROUND OF THE INVENTION

1. Field of the Invention

The present invention relates generally to a system and method for retransmitting packet data from a mobile terminal in an asynchronous Code Division Multiple Access (CDMA) mobile communication system servicing an enhanced uplink dedicated transport channel (EUDCH), and in particular, to a system and method for retransmitting packet data from a mobile terminal in a soft handover region.

2. Description of the Related Art

In general, a user equipment (UE) selects its data rate to be below a preset available highest data rate. The highest data rate is provided by a radio network controller (RNC). Thus, a Node B does not participate in controlling the uplink data rate. However, the Node B determines the availability of uplink transmission and the available highest data rate for the EUDCH and transmits the information to the UE based on a scheduling command. The UE then determines its data rate according to the scheduling command. The EUDCH was designed to improve the performance of uplink packet transmission in an asynchronous mobile communication system.

FIG. 1 is a bock diagram illustrating an example of scheduling in a Node B to service the EUDCH in an asynchronous CDMA mobile communication system.

Referring to FIG. 1, a Node B 110 is one of the active Node Bs supporting a packet data service on the EUDCH. UEs 112, 114, 116 and 118 transmit packet data to the Node B 110 on the EUDCH. Reference numerals 122, 124, 126 and 128 denote the EUDCH operating at data rates determined by scheduling in the Node B 110.

Usually, as the data rate of a UE increases/decreases, its transmission power also increases/decreases, respectively. This implies that a signal at a high data rate than the current data rate of the UE greatly influences an Rise Over Thermal (ROT) measurement of the Node B and a signal at a low data rate than the current data rate of the UE slightly influences the ROT measurement of the Node B. That is, as the uplink data rate increases, more uplink radio resources are occupied. The Node B schedules EUDCH packet data by considering the relationship between the data rate and radio resources and a requested data rate.

The Node B 110 determines the availability and the data rate of the EUDCH for each UE using the EUDCH according to a UE-requested data rate and channel condition. This scheduling is done in the manner that a low data rate is assigned to a remote UE and a high data rate to a near UE, while an ROT measurement does not exceed a target ROT. In FIG. 1, the distances between the UEs 112 to 118 and the Node B 110 are different. The UE 116 is nearest to the Node B 110, whereas the UE 112 is furthest away from the Node B 110. As indicated by arrows 122 to 128 having different thicknesses, the UEs 112 to 128 use different transmission powers according to their distances to the Node B 110. The transmission power of the nearest user equipment which is UE 116, is the smallest as indicated by the least thick arrow 126, while that of the user equipment which is the furthest away UE 112, is greatest as indicated by the thickest arrow 122. Therefore, the Node B 110 schedules EUDCH data such that the transmission power is inversely proportional to the data rate in order to achieve the best performance, while the same ROT is maintained and inter-cell interference is reduced. The Node B 110 then assigns the lowest data rate to the UE 112.

FIG. 2 is a call flow diagram illustrating an example of a signaling flow between a Node B and a UE for an EUDCH service in the asynchronous CDMA mobile communication system. The Node B and the UE are assumed to be the Node B 110 and the UE 112 illustrated in FIG. 1.

Referring to FIG. 2, an EUDCH is established between the Node B 110 and the UE 112 in step 201. The EUDCH setup involves transmission/reception of messages on a dedicated transport channel. After the EUDCH setup is completed, the UE 112 transmits to the Node B 110 a data rate and uplink channel condition information which is required for scheduling in step 202. The uplink channel condition information includes information about uplink transmission power and a transmission power margin. In step 203, the Node B 110 estimates a forward channel condition by comparing the uplink transmission power and reception power. If the difference between the transmission power and the reception power is narrow, the Node B 110 assumes that the channel condition is good, and if the difference is wide, the Node B 110 assumes that the channel condition is bad. If the transmission power margin information is received as the uplink channel condition information, the Node B 110 estimates the uplink transmission power by subtracting the transmission power margin from the already-known available maximum transmission power of the UE 112. The Node B 110 determines the available highest data rate for the EUDCH using the estimated channel condition and a data rate requested by the UE. In step 204, the Node B 110 provides the determined highest data rate to the UE 112. Specifically, the Node B 110 determines modulation schemes and the numbers of codes for packet data transmission in the next transmission time interval (TTI) from UEs including the UE 112 to which the EUDCH service is available in step 203. Thus, the Node B 110 assigns the modulation scheme and the number of available codes to the UE 112 in step 204. Scheduling is Node B-dependent. In step 205, the Node B 112 selects its data rate according to the received highest data rate, and also selects a Transport Format and Resource related Information (TFRI) for the EUDCH packet data in order to allows the Node B 110 to prepare for packet data reception. The UE 112 transmits control information containing the TFRI and the data rate to the Node B 110 in step 206. The TFRI information may include information about orthogonal variable spreading factor (OVSF) code, modulation, data size, and HARQ. In step 207, the UE 112 transmits the packet data to the Node B 110 on the EUDCH. The Node B 110 checks errors possibly generated in the received packet data and selects an Acknowledgement (ACK) signal or an Negative ACK (NACK) signal according to the error check result in step 208. In step 209, the Node B 110 transmits the ACK/NACK signal to the UE 112.

FIG. 3 is a block diagram illustrating an example of a soft handover for a UE in the asynchronous CDMA mobile communication system. Referring to FIG. 3, data from a UE 304 in a soft handover region reaches a plurality of active Node Bs 301, 302 and 303 covering the soft handover region. A Node B that has successfully demodulated the received data without errors transmits the demodulated data to an RNC 305. The RNC 305, since it receives the same data from a plurality of Node Bs, achieves a selective diversity gain. This soft handover operation is widely implemented in existing mobile communication systems and also applicable to the EUDCH service.

For application of the soft handover operation to the EUDCH service, the node Bs 301, 302 and 303 receive EUDCH packet data from the UE 304. If they receive the EUDCH packet data without errors, the Node Bs 301, 302 and 303 transmit the received packet data to the RNC 305. If the packet data has errors, the Node Bs 301, 302 and 303 request the UE 304 to retransmit the EUDCH packet data. Since the RNC 305 receives the same data from a plurality of Node Bs, it can ensure a required EUDCH packet data reception performance, minimizing the uplink transmission power of the UE 304.

Hybrid Automatic Retransmission Request (HARQ) is significant to the EUDCH service as it is to High Speed Downlink Packet Access (HSDPA) of 3GPP and 1xEV-DV of 3GPP2. Especially when a UE is in a soft handover region, the importance of HARQ becomes great because it is closely related to the whole system efficiency. The reason for supporting soft handover in the uplink mobile communication system servicing the EUDCH is to service stable uplink data transmission irrespective of the location of the UE in the active Node Bs. Therefore, it is not reasonable to adopt HARQ of the HSDPA system as it is. When a plurality of active Node Bs simultaneously service an EUDCH to a UE, uplink data retransmission by HARQ occurs as illustrated in FIG. 4.

FIG. 4 is a call flow diagram illustrating an example of an uplink packet transmission from a UE in a soft handover region to a plurality of active Node Bs in the saynchronous CDMA mobile communication system supporting the EUDCH. It is assumed that signaling is performed in the same manner as signaling between the UE 304 and the Node Bs 301, 302 and 303 illustrated in FIG. 3.

Referring to FIG. 4, the UE 304, which is placed in a soft handover region, transmits uplink data #1 to the Node Bs 301, 302 and 303 on an EUDCH in steps 421, 431, and 441. The Node Bs 301, 302 and 303 check errors in the received data and transmit ACK/NACK signals to the UE 304. It is assumed herein that the uplink data #1 delivered to the Node Bs 301 and 302 have errors. Thus, the Node Bs 301 and 302 transmit $NACK_{Node\ B}$ #1 to the UE 304 in steps 453 and 452, while the Node B 303 transmits $ACK_{Node\ B}$ #1 to the UE 304 in step 451. The Node B 303 demodulates normal data #1 and transmits the demodulated data to the RNC 305. The RNC 305 transmits the received data #1 to a higher-layer network in step 414. At the same time, the UE 304 receives $ACK_{Node\ B}$ #1 or $NACK_{Node\ B}$ #1 for the uplink data #1 from the Node Bs 301, 302 and 303. The UE 304 transmits new packet data #2 on an EUDCH to the Node Bs 301, 302 and 303 in response to $ACK_{Node\ B}$ #1 from the Node B 303 in steps 422, 432 and 442.

As the UE 304 receives different response signals, ACK and NACK from the Node Bs 301, 302 and 303, retransmission by HARQ is not decided with reliability. Moreover, since the RNC 305 guarantees space diversity for the uplink data #1 received in different paths, errors in the uplink data #1 received at the Node Bs 301, 302 and 303 are not corrected.

FIG. 5 is a block diagram illustrating examples of a channel structure for delivering ACK/NACK information from a Node B to a UE in the asynchronous CDMA mobile communication system supporting the EUDCH.

Referring to FIG. 5, each of a plurality of Node Bs demodulates uplink packet data received from the UE and selects ACK/NACK information 510 indicating normal/defective packet reception. Each Node B transmits the ACK/NACK information 510 and downlink information (an Information field) to the UE on a dedicated transport channel supporting the EUDCH service or in a field of an existing channel.

However, as the Node Bs transmit different ACK/NACK information for the packet data #1 to the UE, the reliability of the ACK/NACK information is not ensured to the UE. Therefore, HARQ for the uplink communication system using the EUDCH must be designed to be different from the HARQ of the HSDPA communication system.

SUMMARY OF THE INVENTION

It is, therefore, an object of the present invention to provide a method and system for retransmitting packet data from a UE in a mobile communication system servicing an EUDCH.

It is another object of the present invention to provide a method and system for retransmitting uplink packet data from a UE in a soft handover region to a plurality of Node Bs in a mobile communication system servicing an EUDCH.

It is a further object of the present invention to provide a method of deciding whether to retransmit uplink packet data according to response signals indicating normal or erroneous reception of the packet data, received from a plurality of Node Bs in a UE placed in a soft handover region in a mobile communication system servicing an EUDCH.

It is still another object of the present invention to provide a method of deciding whether to retransmit uplink packet data according to response signals indicating normal or erroneous reception of the packet data, received from an RNC in a UE placed in a soft handover region in a mobile communication system servicing an EUDCH.

The above and other objects are substantially achieved by a method of retransmitting uplink packet data from a user equipment (UE) in a handover region to Node Bs. According to one embodiment of the present invention, the UE transmits packet data to the Node Bs on an enhanced uplink dedicated transport channel (EUDCH). The Node Bs transmit to the UE first response fields indicating whether the Node Bs have received good packet data or bad packet data, and second response fields that the Node Bs received from a radio network controller (RNC) indicating whether the RNC has received good packet data or bad packet data. The UE then detects the first and second response fields and retransmits the uplink packet data according to the values of the response fields in the UE.

According to another embodiment of the present invention, a user equipment (UE) receives from the active Node Bs first response fields indicating normal or erroneous reception of the uplink packet data in the active Node Bs and second response fields indicating normal or erroneous reception of the uplink packet data in a radio network controller (RNC). The UE then decides the reliability of the first response fields and compares the reliability with a predetermined threshold. If the reliability is greater than the threshold, the UE transmits next uplink packet data. If the reliability is less than or equal to the threshold, the UE retransmits the uplink packet data.

According to a further embodiment of the present invention, in a packet data retransmitting apparatus for retransmitting uplink packet data to a plurality of active Node Bs in a user equipment (UE), a Node B response field detector receives downlink channels supporting an enhanced uplink dedicated transport channel (EUDCH) from the active Node Bs and detects first response fields indicating normal or erroneous reception of the uplink packet data in the active Node Bs. A radio network controller (RNC) response field detector receives the downlink channels and detects second response fields indicating normal or erroneous reception of the uplink packet data in the RNC. A controller decides whether to retransmit the uplink packet data according to the first and second response fields, selects uplink packet data to be retransmitted, and controls a memory to transmit the selected uplink packet data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
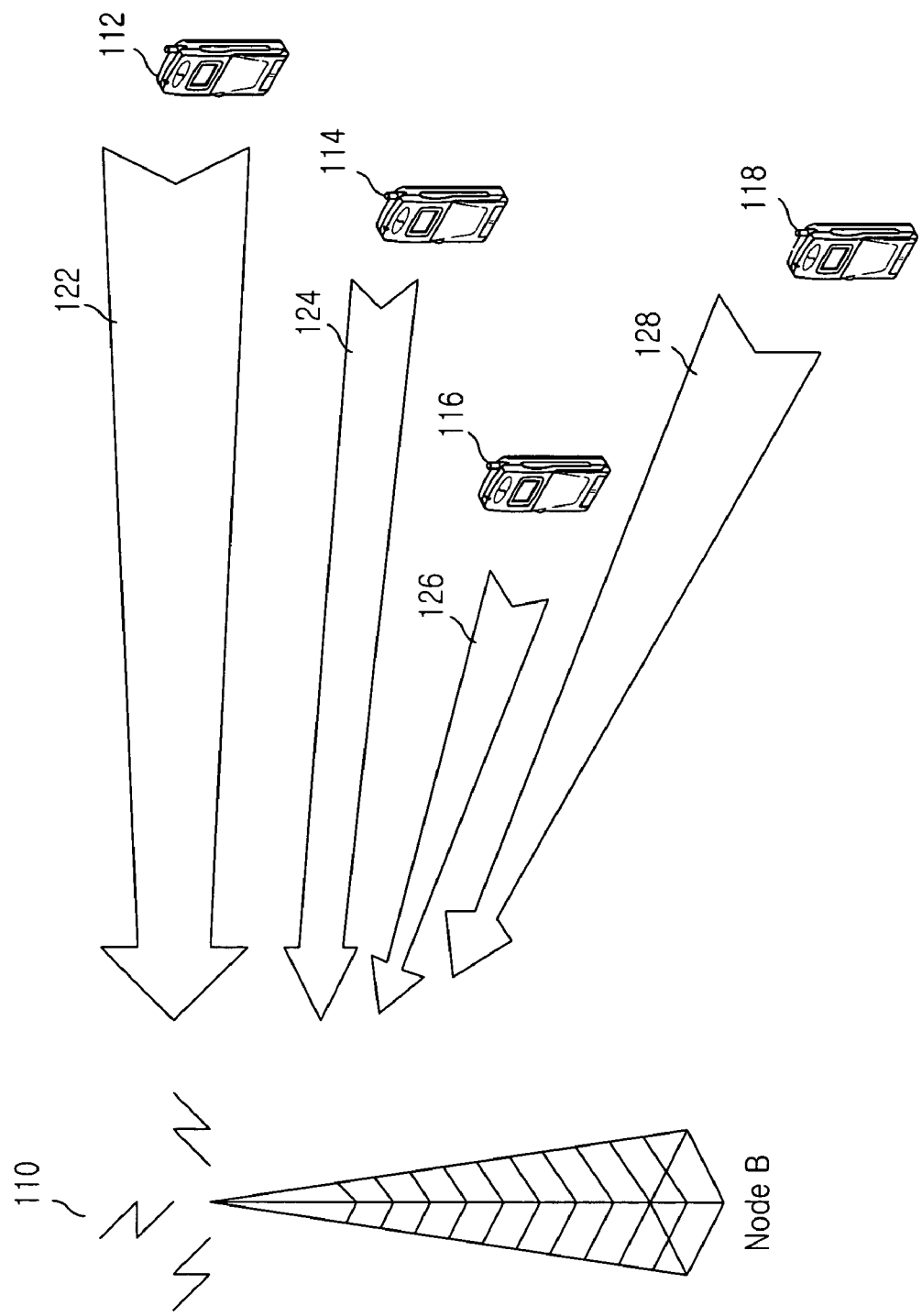
FIG. 1 is a block diagram illustrating an example of scheduling for an enhanced uplink dedicated transport channel (EUDCH) service in a Node B in an asynchronous CDMA mobile communication system.
Figure 2:
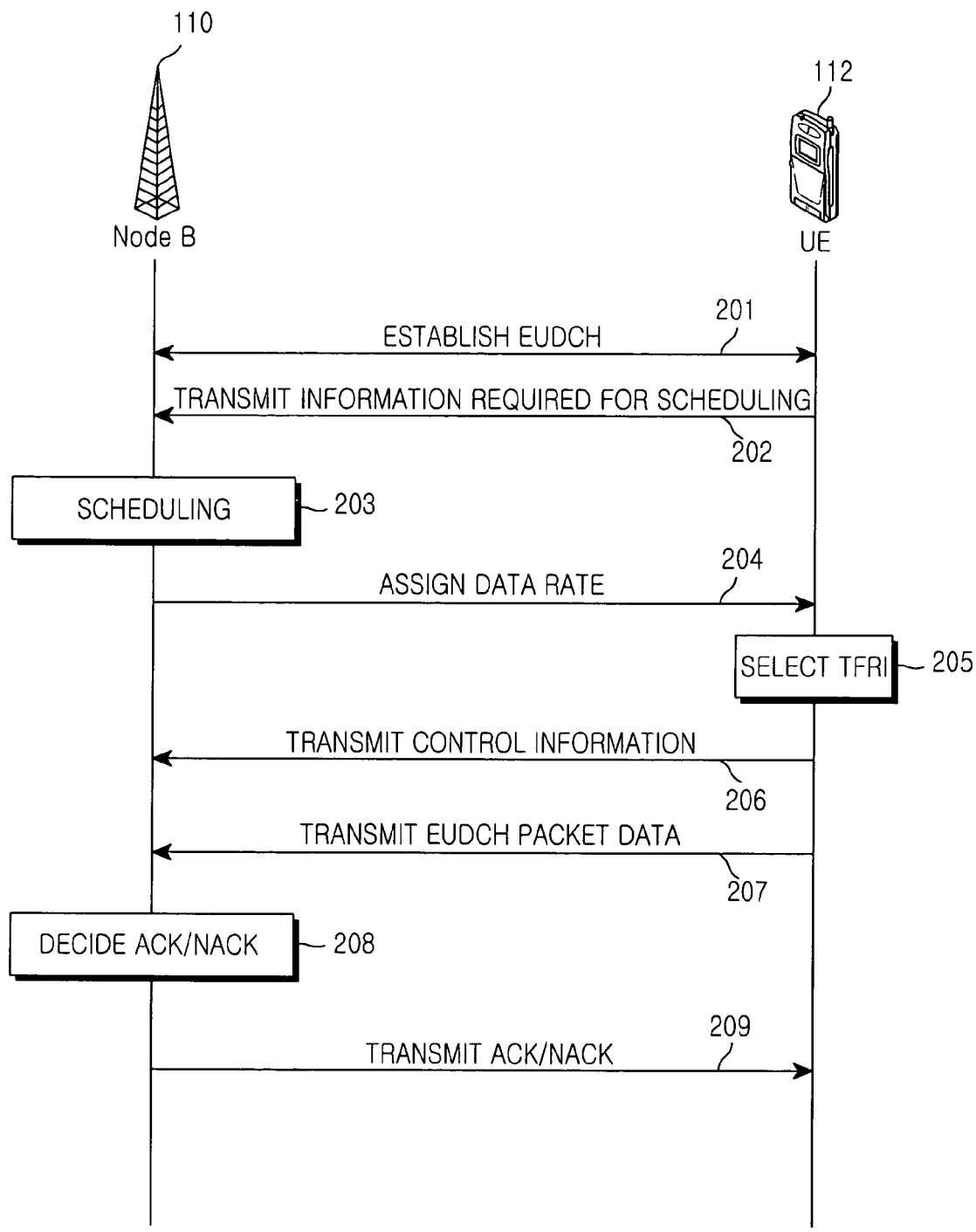
FIG. 2 is a call flow diagram illustrating an example of a signaling procedure between a Node B and a user equipment (UE) for the EUDCH service in the asynchronous CDMA mobile communication system.
Figure 3:
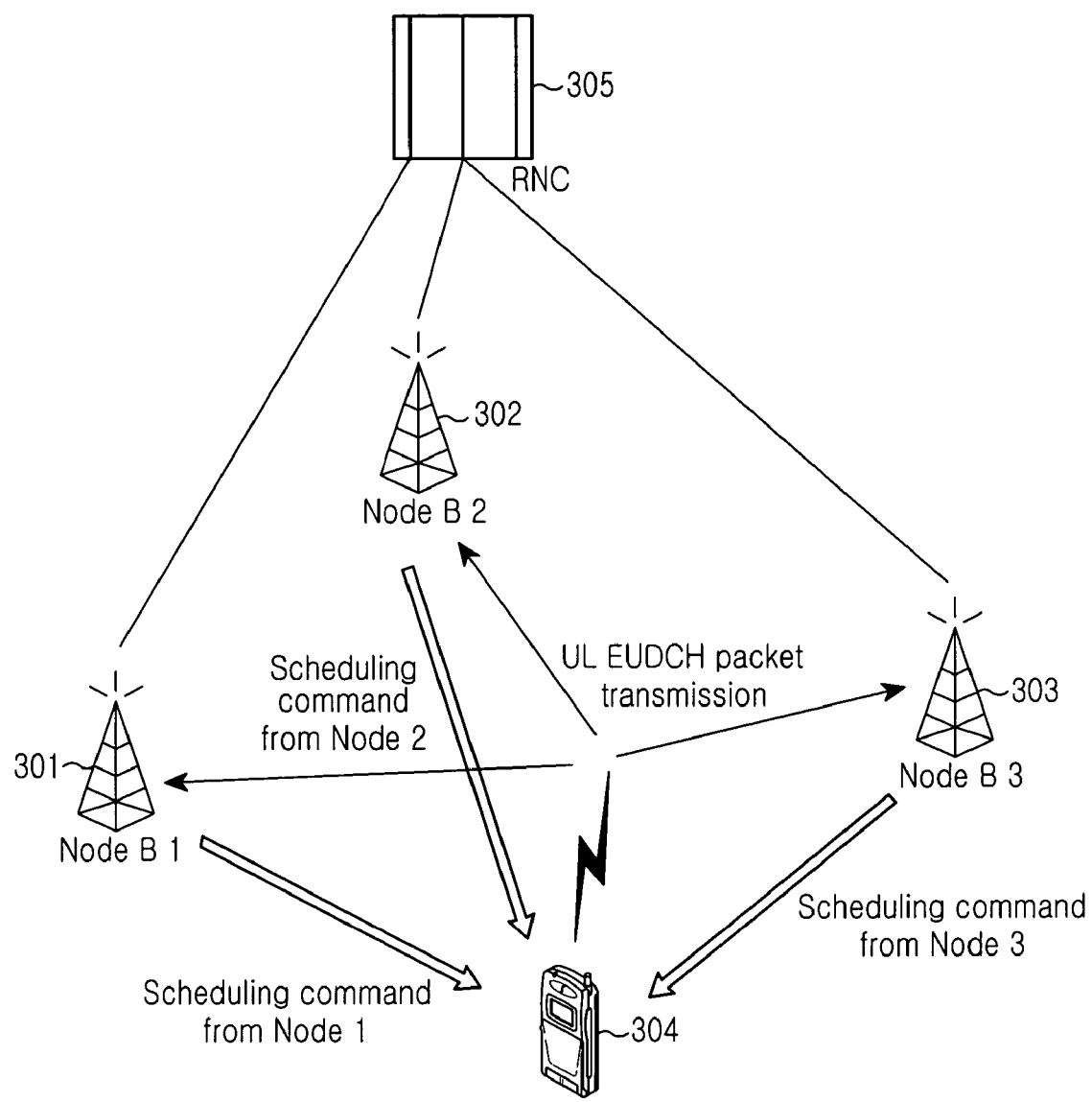
FIG. 3 is a block diagram illustrating an example of a soft handover for the UE in the asynchronous CDMA mobile communication system supporting the EUDCH.
Figure 4:
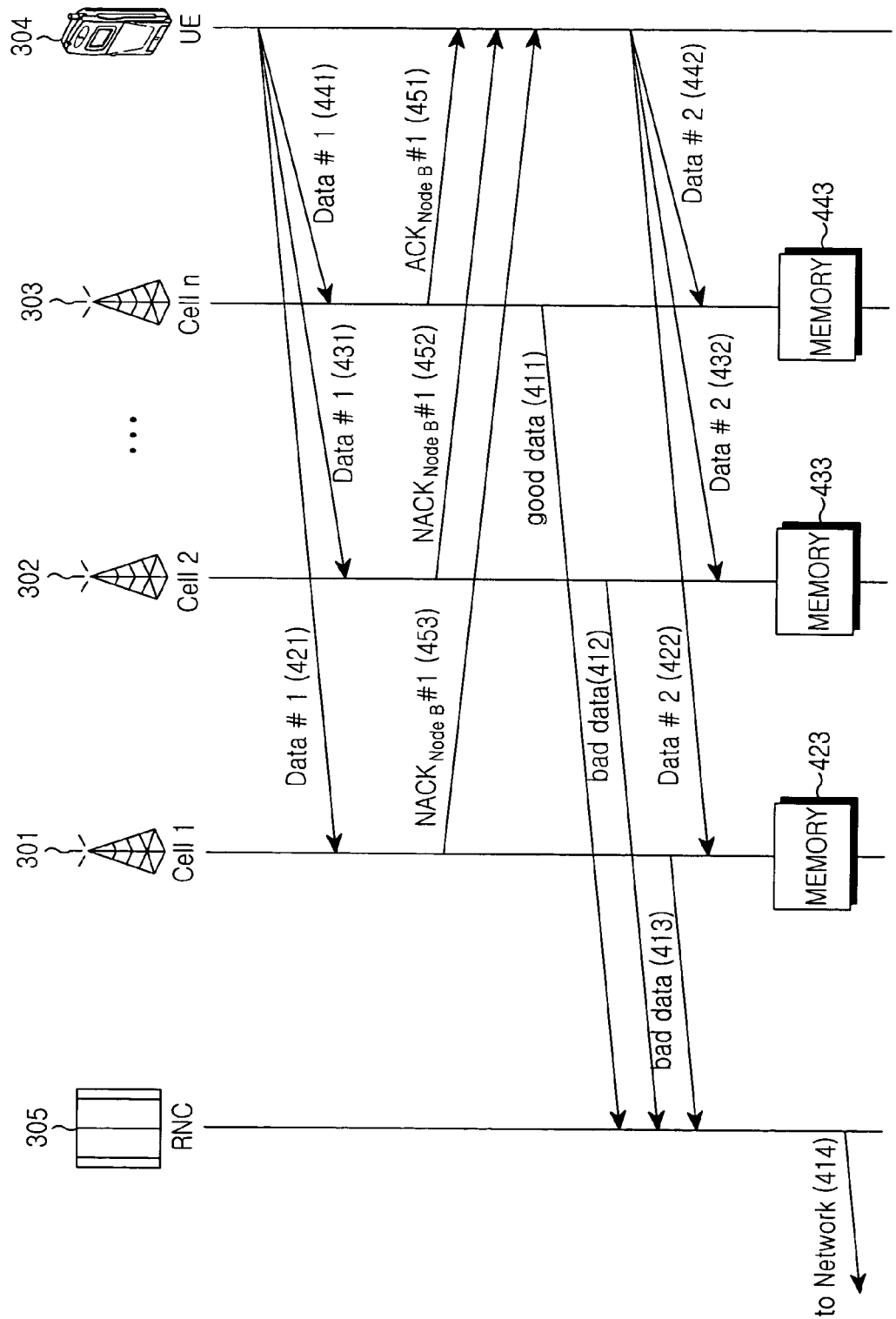
FIG. 4 is a call flow diagram illustrating an example of packet data transmission from the UE in a soft handover region to a plurality of Node Bs in the asynchronous CDMA mobile communication system supporting the EUDCH.
Figure 5:
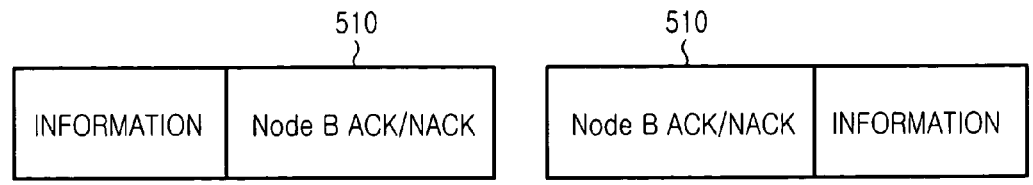
FIG. 5 is a block diagram illustrating an example of channel structures for delivering ACK/NACK information in response to packet data transmitted from the UE in the asynchronous CDMA mobile communication system supporting the EUDCH.
Figure 6:
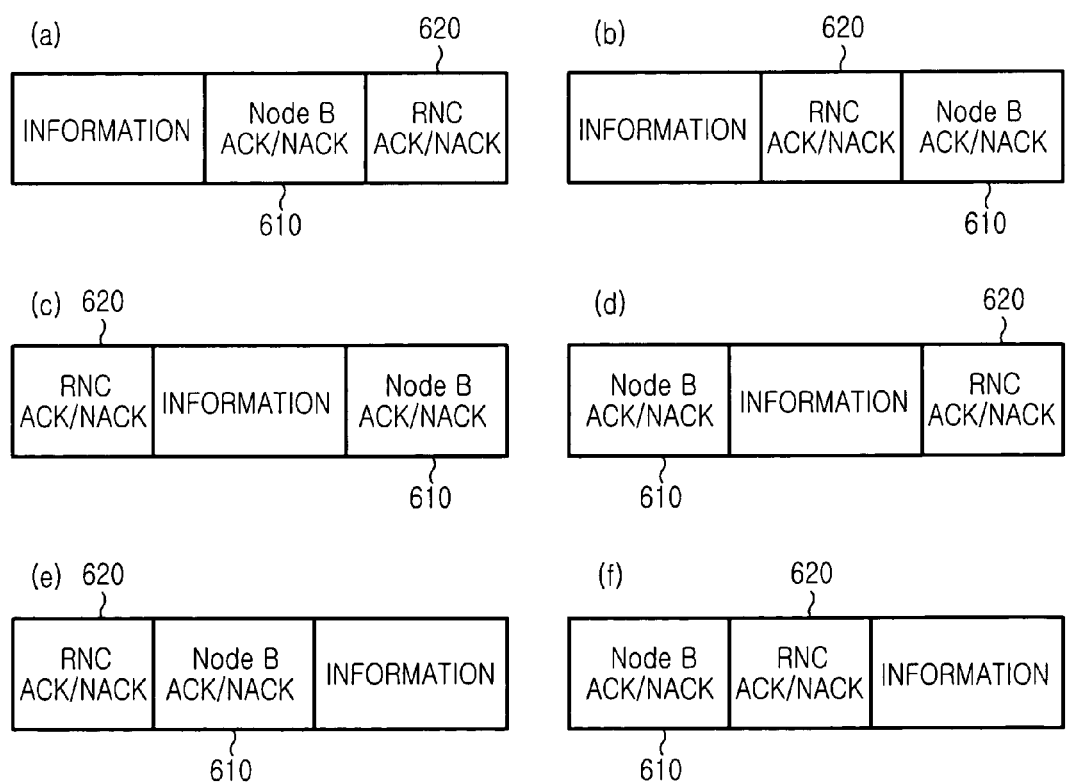
FIGS. 6A to 6F are block diagrams illustrating an example of channel structures for delivering ACK/NACK information in response to packet data transmitted from a UE in an asynchronous CDMA mobile communication system supporting an EUDCH according to an embodiment of the present invention.

Several embodiments of the present invention will be described with reference to the accompanying drawings. In the following description, well-known functions or constructions are omitted for conciseness.

The present invention introduces a novel Hybrid Automatic Retransmission Request (HARQ) scheme for an uplink communication system using an EUDCH, providing soft handover. It should be appreciated by those skilled in the art that the term handover refers to a handoff. In accordance with the present invention, the uplink communication system adopts the HARQ scheme of the HASDPA communication system.

That is, the uplink transmission system uses Adaptive Modulation and Coding and HARQ (AMC). In this context, n-channel (SAW HARQ) n-channel Stop And Wait Hybrid Automatic Retransmission Request (SAW HARQ) will be described below.

N-channel SAW HARQ employs the following two new techniques to increase SAW ARQ efficiency.

(1) Soft combining: a receiver temporarily stores data having errors in a soft buffer (hereinafter, referred to as a memory) and combines the stored data with a retransmitted version of the data to reduce an error probability. There are two soft combing methods: Chase Combining (CC) and Incremental Redundancy (IR).

In the CC, a transmitter performs an initial transmission and a retransmission using the same format. If m symbols are initially transmitted in one coded block, the number of retransmitted symbols is also m. The coding block is defined as user data transmitted for one transmission time interval (TTI). In other words, the same coding rate is applied for the initial transmission and the retransmission. A receiver then combines the initial coding block with the retransmission coding block and Cyclic Redundancy Check (CRC)-checks the combined coding block to detect errors.

In the IR, the transmitter uses different formats for the initial transmission and the retransmission. If m symbols are generated from the input of n-bit user data through channel coding, the transmitter initially transmits part of the m symbols and retransmits the other part of the m symbols, sequentially. Thus, the initial transmission and the retransmission are performed at different coding rates. The receiver then forms a coding block with a higher coding rate by attaching the retransmission block to the initial transmission block and performs a CRC check. The initial transmission is distinguished from the retransmission by its version number. The initial transmission version is numbered with 1, the first retransmission version with 2, the second retransmission version with 3, and so on in this manner. The receiver combines the initial transmission block with the retransmission block using the version numbers.

The IR scheme is further branched into partial IR and full IR. The partial IR takes part of the initial transmission format for retransmission, while the full IR uses entirely different formats for the initial transmission and the retransmission. With the full IR, it is possible to achieve maximum gain using redundancy information. However, received data cannot be decoded only with a retransmission version of the data and, in other words, is not self-decodable. In turbo coding, systematic bits are not punctured during an initial transmission. Therefore, the systematic bits are excluded from retransmission based on the full IR. If the number of bits of retransmission data consisting of parity bits is equal to or less than the number of the systematic bits before the channel coding, the data is not self-decodable. Thus, normal data reception is possible as long as the initial transmitted data and the retransmitted data are soft-combined, if the retransmitted data is not self-decodable.

(2) Setup of n logical channels between a UE and a plurality of Node Bs: a Node B does not transmit the next packet until it receives an ACK signal for the previously transmitted packet in a typical SAW. In this case, the Node B must receive the ACK signal before it can transmit the next packet. Therefore, the n-channel SAW HARQ allows sequential transmission of a plurality of packets without receiving an ACK signal for the previously transmitted packet, to increase the efficiency of radio links. Specifically, n logical channels are established between the UE and the Node Bs. The logical channels are identified by preset times or explicit channel numbers so that the UE can identify a logical channel that delivers a packet at a certain time. The UE then arranges the received packets in the right order or soft-combines them.

Therefore, the UE transmits packet data on an EUCH for a TTI. A UMTS Terrestrial Radio Access Network (UTRAN) checks errors in the packet data. If the packet data has no errors, the UTRAN transmits an ACK signal to the UE. On the contrary, if the packet data has errors, the UTRAN transmits a NACK signal to the UE. In the latter case, the UE retransmits the packet data to the UTRAN and the UTRAN soft-combines the packet data having errors with the retransmitted packet data, thus increasing an error correction rate.

FIGS. 6A to 6F are block diagrams illustrating examples of a channel that delivers ACK/NACK information for transmitted uplink packet data to a UE in an EUDCH-supporting mobile communication system according to an embodiment of the present invention.

Referring to FIGS. 6A to 6F, a plurality of active Node Bs transmit ACK/NACK signals for received packet data to a UE in a soft handover region. An RNC connected to the Node Bs checks and corrects errors in the packet data by using space diversity-combining. The RNC then transmits ACK/NACK signals to the Node Bs. Each of the Node Bs transmits to the UE the RNC ACK/NACK signal and its ACK/NACK signal which are adjacent to or apart from each other irregardless of sequence, along with downlink information in an Information field. The Node B ACK/NACK signal and the RNC ACK/NACK signal can be delivered in a field of a downlink dedicated physical data channel (DL_DPCH) or a high-speed physical downlink shared channel (HS-PDSCH) supporting HSDPA. Or they can be transmitted to the UE on a dedicated transport channel supporting the EUDCH. The Node B ACK/NACK information may include information on a packet data received earlier than a packet data which the RNC ACK/NACK information relates to.

A description will be made below of uplink packet data retransmission from a UE after reception of ACK/NACK information for the previous uplink packet data in the asynchronous mobile communication system supporting the EUDCH according to the present invention.

Figure 7:
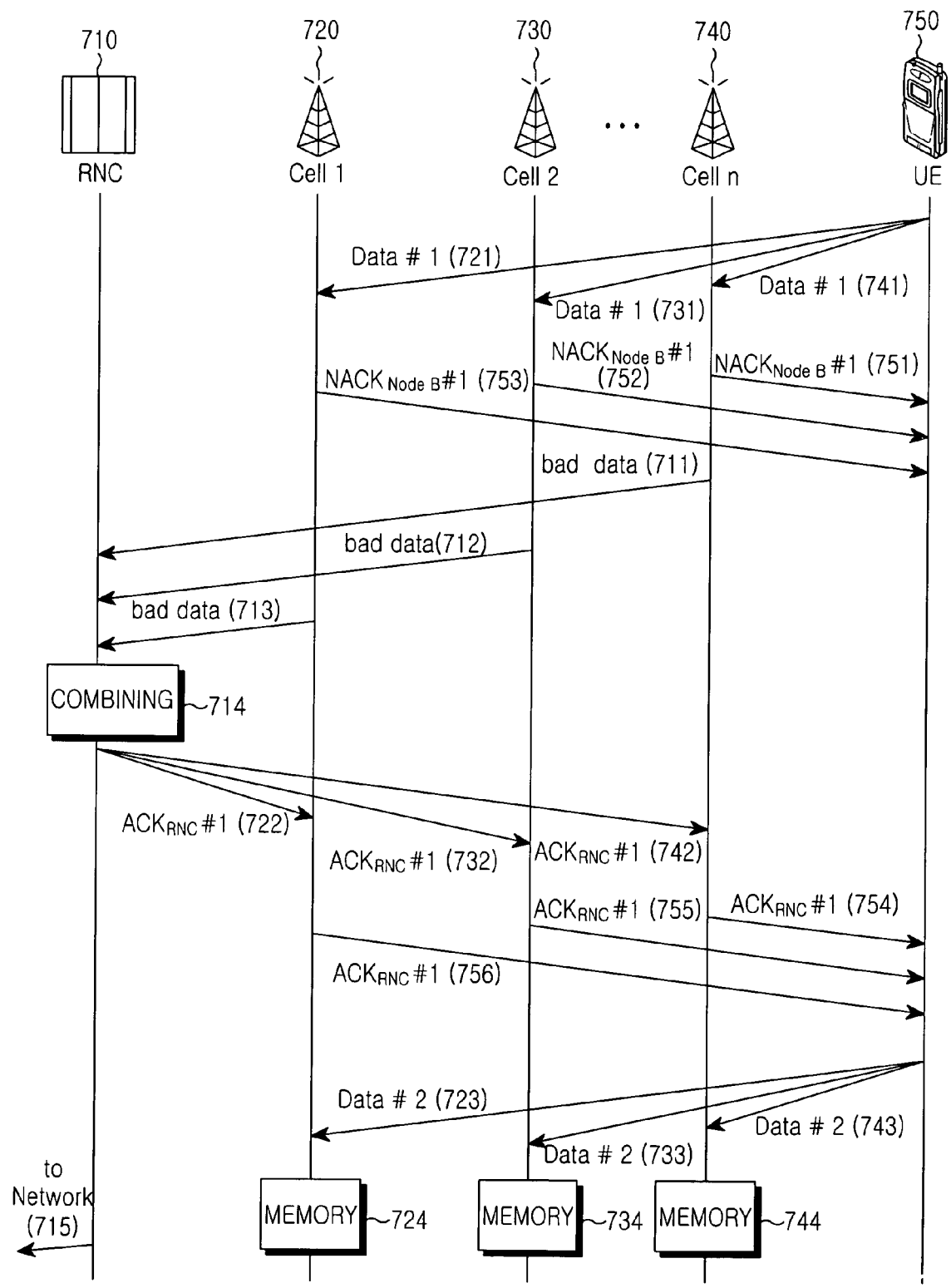
FIG. 7 is a call flow diagram illustrating an example of an uplink packet retransmission procedure in the asynchronous CDMA mobile communication system supporting the EUDCH according to an embodiment of the present invention.

FIG. 7 is a call flow diagram illustrating an example of uplink packet data retransmission in the case where a UE receives NACK information for the previous transmitted packet data from each Node B but ACK information from an RNC connected to the Node Bs in the EUDCH-supporting mobile communication system according to an embodiment of the present invention.

Referring to FIG. 7, a UE 750 is located in a soft handover region covered commonly by Node Bs 720, 730 and 740. Thus, the UE 750 transmits uplink data #1 to the Node Bs 720, 730 and 740 on an EUDCH in steps 721, 731, and 741. Each Node B checks errors in the received uplink data #1 and transmits ACK/NACK information to the UE 750 according to the error check result. The Node Bs 720, 730 and 740 transmit $NACK_{Node\ B}$ #1 to the UE 750 in steps 753, 752 and 751. They simultaneously transmit the uplink data #1 to an RNC 710 in steps 711, 712 and 713. The RNC 710 space diversity-combines the uplink data #1 having errors received from different paths and checks errors in step 714. The RNC 710 then transmits the uplink data #1 to a higher-layer network after error correction is performed in step 715. The RNC 710 also transmits $ACK_{RNC}$ #1 for the corrected data to each of the Node Bs 720, 730 and 740 in steps 722, 732 and 742, which in turn transmit $ACK_{RNC}$ #1 to the UE 750 in steps 754, 755 and 756. The UE 750 transmits new packet data #2 to the Node Bs 720, 730 and 740 in steps 723, 733 and 743. The uplink data #2 is temporarily stored in memories 724, 734 and 744 of the Node Bs 720, 730 and 740.

As described above, the UE 750 transmits the packet data #2 in response to the ACK signal received from the RNC 710 even though it receives $NACK_{Node\ B}$ #1 from the Node Bs 720, 730 and 740. Therefore, delay involved in uplink data transmission is reduced and the reliability of the packet data #1 is ensured.

In another embodiment of the present invention, a UE receives NACK signals from a plurality of Node Bs and an RNC, and retransmits the packet data #1. Here, each of the Node Bs soft-combines the initial packet data #1 and the retransmitted packet data #1. After receiving an ACK signal from a Node B, the UE transmits packet data #2. A predetermined time later, the UE receives an ACK signal for the retransmitted packet data #1 from the RNC. Thus, the reliability of the packet data #1 is ensured.

Figure 8:
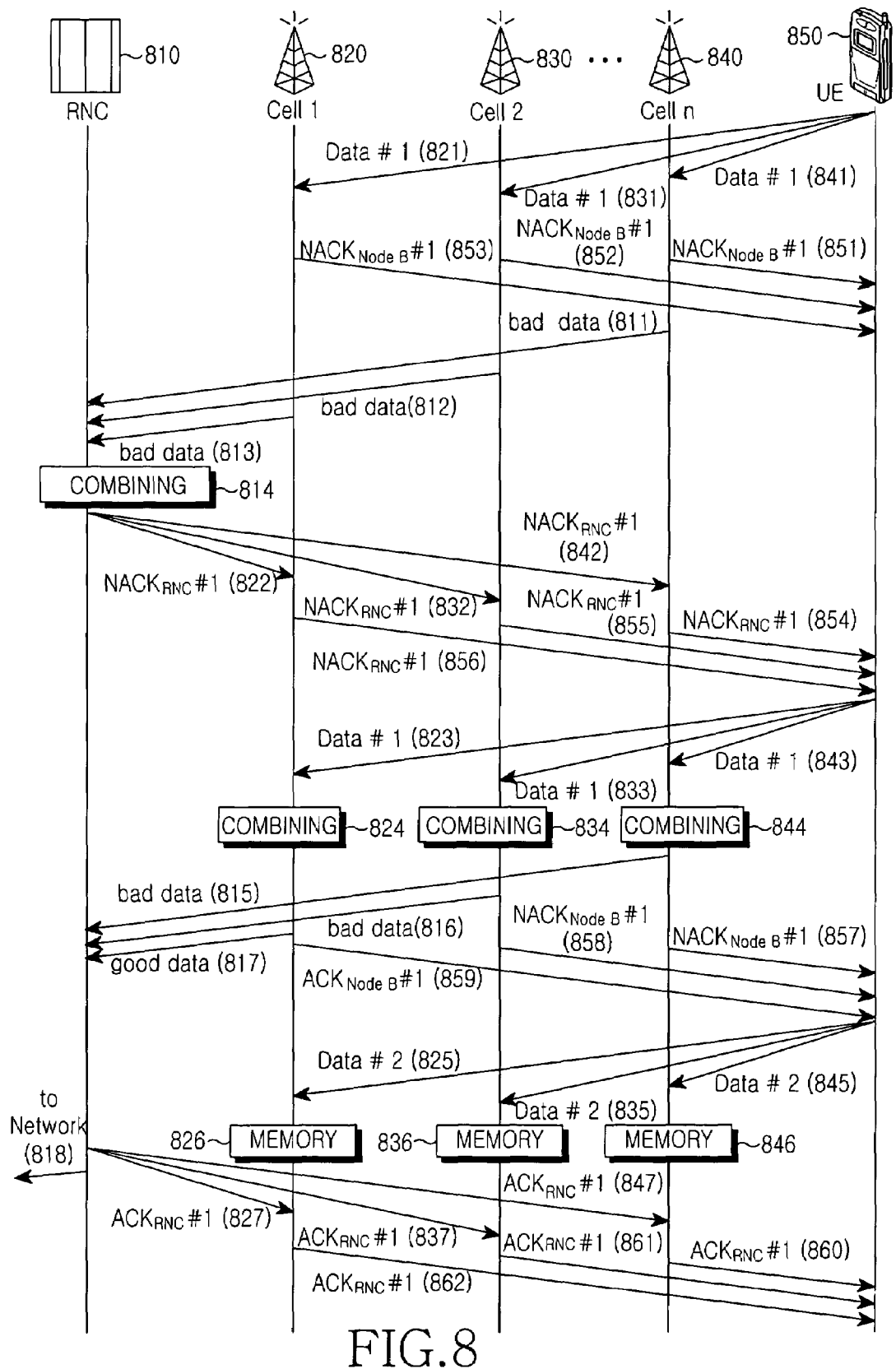
FIG. 8 is a call flow diagram illustrating an example of the uplink packet retransmission procedure in the asynchronous CDMA mobile communication system supporting the EUDCH according to another embodiment of the present invention.

FIG. 8 is a call flow diagram illustrating an example of the uplink packet data retransmission in the mobile communication system supporting the EUDCH according to another embodiment of the present invention.

Referring to FIG. 8, a UE 850 is located in a soft handover region covered commonly by Node Bs 820, 830 and 840.

Thus, the UE 850 transmits uplink data #1 to the Node Bs 820, 830 and 840 on an EUDCH in steps 821, 831, and 841. Each Node B checks errors in the received uplink data #1 and transmits ACK/NACK information to the UE 850 according to their error check result. Each of the Node Bs 820, 830 and 840 detects errors in the uplink packet data #1 and transmits $NACK_{Node\,B}$ #1 to the UE 850 in steps 851, 852 and 853. At the same time, they transmit the uplink data #1 to an RNC 810 in steps 811, 812 and 813. The RNC 810 space diversity-combines the uplink data #1 having errors received from different paths and checks errors in step 814. The RNC 810, which does not correct the errors, then transmits $NACK_{RNC}$ #1 to each of the Node Bs 820, 830 and 840 in steps 822, 832 and 842, which in turn transmit $NACK_{RNC}$ #1 to the UE 850 in steps 854, 855 and 856. The UE 850 retransmits the packet data #1 to the Node Bs 820, 830 and 840 in steps 823, 833 and 843. The Node Bs 820, 830 and 840 soft-combine the previous packet data #1 stored in the memories of the Node Bs 820, 830 and 840 with the retransmitted packet data #1 and correct errors in steps 824, 834 and 844. The Node Bs 820, 830 and 840 transmit the soft-combining results to the RNC 810. That is, the Node B 820 transmits error-corrected packet data #1 to the RNC 810 in step 817, while the Node Bs 830 and 840 transmit packet data #1 having errors to the RNC 810 in steps 815 and 816. At the same time, the Node B 820 transmits $ACK_{Node\,B}$ #1 for the corrected data #1 to the UE 850 in step 859. The Node Bs 830 and 840 transmit $NACK_{Node\,B}$ #1 for the error-having packet data #1 to the UE 850 in steps 858 and 857. The UE 850 then transmits packet data #2 for the $ACK_{Node\,B}$ #1 to the Node Bs 820, 830 and 840 in steps 825, 835 and 845. The packet data #2 is stored in the memories of the Node Bs 820, 830 and 840 in steps 826, 836 and 846. The RNC 810 checks errors in the previous packet data #1 and the retransmitted packet data #1 by using space diversity-combining and soft-combining, or selects the error-corrected data #1 by using selective diversity. The RNC 810 then transmits ACKRNC #1 for the packet data #1 to the Node Bs 820, 830 and 840 in steps 827, 837 and 847. The Node Bs 820, 830 and 840 in turn transmit $ACK_{RNC}$ #1 to the UE 850 in steps 860, 861 and 862.

As described above, the UE 850 receives $ACK_{RNC}$ #1 for the packet data #1 from the RNC 810 a predetermined time later. Thus, the reliability of the packet data #1, that is, the reliability of ACK/NACK signals transmitted from the Node Bs 820, 830 and 840 is ensured.

In a third embodiment of the present invention, a UE receives NACK signals from a plurality of Node Bs and an RNC, and retransmits the packet data #1. After receiving an NACK signal from all the Node Bs but an ACK signal from the RNC, the UE transmits packet data #2.

Figure 9:
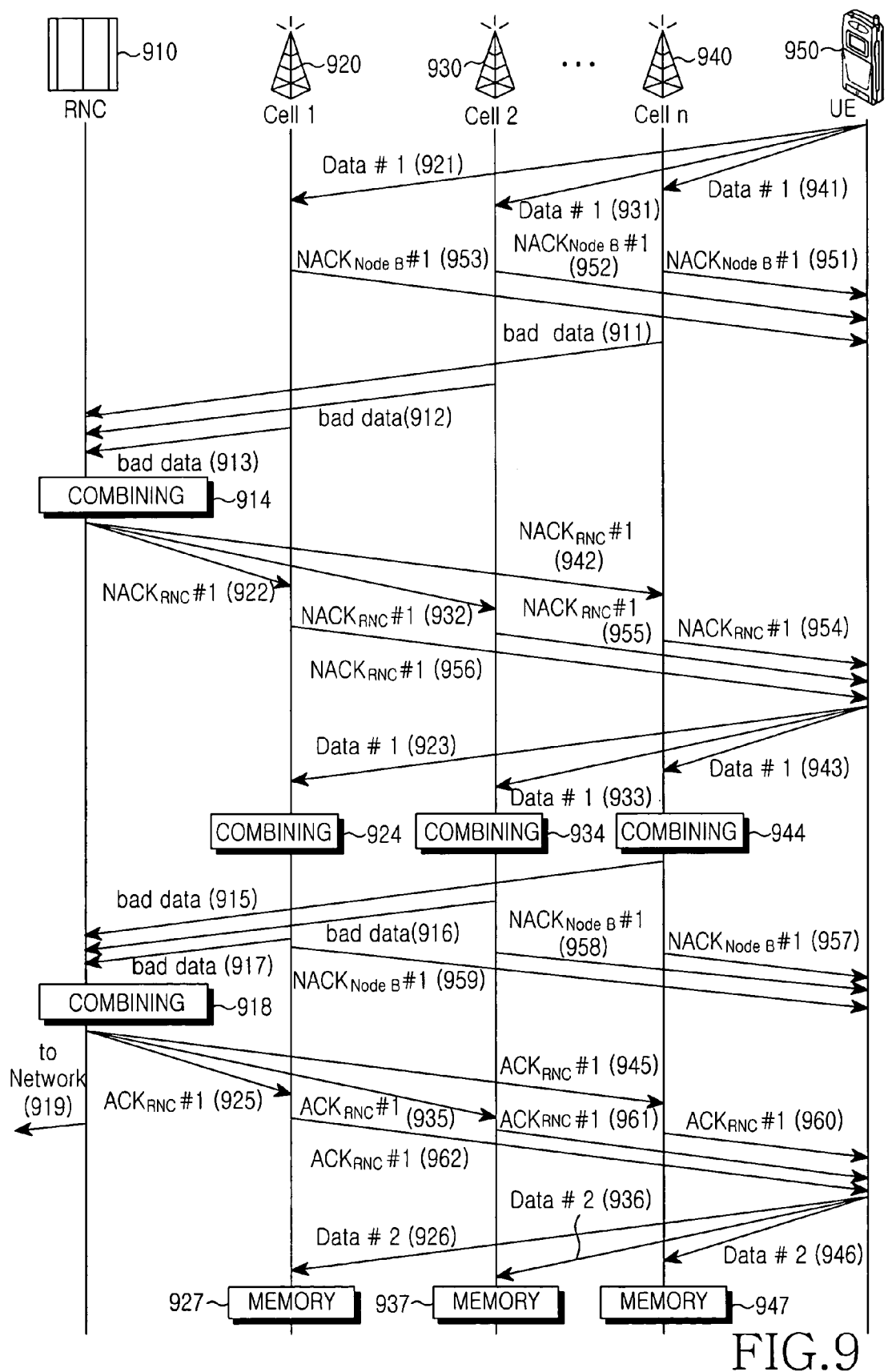
FIG. 9 is a call flow diagram illustrating an example of the uplink packet retransmission procedure in the asynchronous CDMA mobile communication system supporting the EUDCH according another embodiment of the present invention.

FIG. 9 is a call flow diagram illustrating an example of the uplink packet data retransmission in the mobile communication system supporting the EUDCH according to another embodiment of the present invention.

Referring to FIG. 9, a UE 950 is located in a soft handover region covered commonly by Node Bs 920, 930 and 940. Thus, the UE 950 transmits uplink data #1 to the Node Bs 920, 930 and 940 on an EUDCH in steps 921, 931, and 941. Each Node B checks errors in the received uplink data #1 and transmits ACK/NACK information to the UE 950 according to their error check result. Each of the Node Bs 920, 930 and 940 detects errors in the uplink packet data #1 and transmits $NACK_{Node\,B}$ #1 to the UE 950 in steps 951, 952 and 953. They also simultaneously transmit the bad uplink data #1 to an RNC 910 in steps 911, 912 and 913. The RNC 910 space diversity-combines the bad uplink data #1 received from different paths and checks errors in step 914. The RNC 910, which does not correct the errors, then transmits $NACK_{RNC}$ #1 to each of the Node Bs 920, 930 and 940 in steps 922, 932 and 942, which in turn transmit $NACK_{RNC}$ #1 to the UE 950 in steps 954, 955 and 956. The UE 950 retransmits the packet data #1 to the Node Bs 920, 930 and 940 in steps 923, 933 and 943. The Node Bs 920, 930 and 940 soft-combine the previous packet data #1 stored in their memories with the retransmitted packet data #1 and correct errors in steps 924, 934 and 944. The Node Bs 920, 930 and 940 transmit the soft-combining results to the RNC 910. That is, the Node Bs 920, 930 and 940 transmit the bad packet data #1 to the RNC 910 in steps 915, 916 and 917. At the same time, the Node Bs 920, 930 and 940 transmit $NACK_{Node\,B}$ #1 to the UE 950 in steps 957, 958 and 959. The RNC 910 checks errors in the previous packet data #1 and the retransmitted packet data #1 by using space diversity-combining and soft-combining in step 918 and transmits the error-corrected packet data #1 to a higher-layer network in step 919. The RNC 910 then transmits $ACK_{RNC}$ #1 for the good packet data #1 to the Node Bs 920, 930 and 940 in steps 925, 935 and 945. The Node Bs 920, 930 and 940 in turn transmit $ACK_{RNC}$ #1 to the UE 950 in steps 960, 961 and 962. The UE 950 then transmits packet data #2 to the Node Bs 920, 930 and 940 in steps 926, 936 and 946.

As described above, when receiving an NACK signal from the RNC 910, the UE 950 retransmits the packet data #1 as many times as preset by the higher-layer system. After the RNC 910 ensures the reliability of the packet data #1, the UE 950 transmits packet data #2.

In a fourth embodiment of the present invention, a UE receives ACK/NACK signals for transmitted uplink data from a plurality of Node Bs and retransmits the data by deciding the reliability of the ACK/NACK signals according to a preset threshold.

Figure 10:
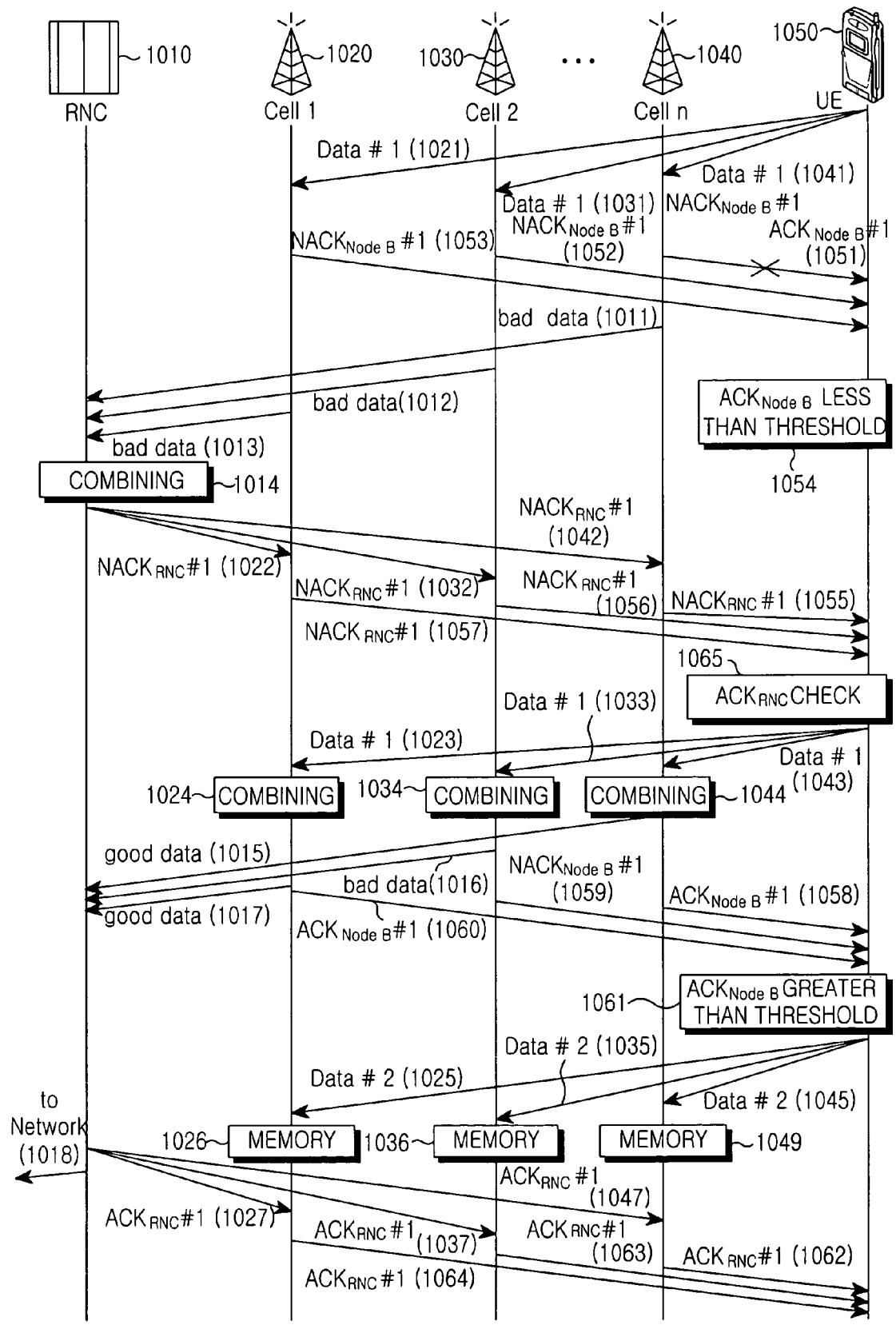
FIG. 10 is a call flow diagram illustrating an example of the uplink packet retransmission procedure in the asynchronous CDMA mobile communication system supporting the EUDCH according to still another embodiment of the present invention.

FIG. 10 is a call flow diagram illustrating an example of the uplink packet data retransmission in the mobile communication system supporting the EUDCH according to still another embodiment of the present invention.

Referring to FIG. 10, a UE 1050 is located in a soft handover region covered commonly by Node Bs 1020, 1030 and 1040. Thus, the UE 1050 transmits uplink data #1 to the Node Bs 1020, 1030 and 1040 on an EUDCH in steps 1021, 1031, and 1041. Each Node B checks errors in the received uplink data #1 and transmits ACK/NACK information to the UE 1050 according to their error check result. Each of the Node Bs 1020, 1030 and 1040 detects errors in the uplink packet data #1 and transmits $NACK_{NodeB}$ #1 to the UE 1050 in steps 1051, 1052 and 1053. But an error is generated in $NACK_{Node\,B}$ #1 transmitted from the Node B 1040 and $ACK_{Node\,B}$ #1 eventually reaches the UE 1050 in step 1051. Yet, the UE 1050 maintains the packet data #1 for a predetermined time, determining that the reliability of $ACK_{Node\,B}$ #1 is less than a predetermined threshold. At the same time, the Node Bs 1020, 1030 and 1040 transmit the bad uplink data #1 to an RNC 1010 in steps 1011, 1012 and 1013. The RNC 1010 space diversity-combines the bad uplink data #1 received from different paths and checks errors in step 1014. The RNC 1010, which does not correct the errors, then transmits $NACK_{RNC}$ #1 to each of the Node Bs 1020, 1030 and 1040 in steps 1022, 1032 and 1042, which in turn transmit $NACK_{RNC}$ #1 to the UE 1050 in steps 1055, 1056 and 1057. The UE 1050 retransmits the packet data #1 in response to $NACK_{Node\,B}$ #1 and $NACK_{RNC}$ #1 to the Node Bs 1020, 1030 and 1040 in steps 1023, 1033 and 1043. The Node Bs 1020, 1030 and 1040 soft-combine the previous packet data #1 stored in their memories with the retransmitted packet data #1 and correct errors in steps 1024, 1034 and 1044. The Node Bs 1020, 1030 and 1040 transmit the soft-combining results to the RNC 1010. That is, the Node Bs 1020 and 1040 transmit good packet data #1 to the RNC 1010 in steps 1015 and 1017, and the RNC 1010 transmits the good packet data #1 to a higher-layer network in step 1018. Meanwhile, the Node B 1030 transmits bad packet data #1 to the RNC 1010 in step 1016. At the same time, the Node Bs 1020 and 1040 transmit $ACK_{Node\ B}$ #1 to the UE 1050 in steps 1058 and 1060, while the Node B 1030 transmits $NACK_{Node\ B}$ #1 to the UE 1050 in step 1059. The UE 1050 compares the reliability of $ACK_{Node\ B}$ #1 with the threshold. If the reliability of $ACK_{Node\ B}$ #1 is greater than the threshold, the UE 1050 transmits packet data #2 in steps 1025, 1035, and 1045. The RNC 1010 checks errors in the previous packet data #1 and the retransmitted packet data #1 by using space diversity-combining and soft-combining and then transmits $ACK_{RNC}$ #1 for the good packet data #1 to the Node Bs 1020, 1030 and 1040 in steps 1027, 1037 and 1047. The Node Bs 1020, 1030 and 1040 in turn transmit $ACK_{RNC}$ #1 to the UE 1050 in steps 1062, 1063 and 1064.

The reliability of the ACK/NACK signals depends on the UE 1050. It is produced using weighting factors for the Node Bs 1020, 1030 and 1040. The weighting factors are variable with time or with EUDCH data. In another embodiment of the present invention, the reliability can be defined to be a ratio of $ACK_{Node\ B}/NACK_{Node\ B}$. For example, let the weighting factors of the Node Bs 1020, 1030 and 1040 be respectively 0.7, 0.2 and 0.1, and the threshold be 0.5. If the UE 1050 receives $ACK_{Node\ B}$ from the Node B 1020 and $NACK_{Node\ B}$ #1 from the Node Bs 1030 and 1040, the reliability of $ACK_{Node\ B}$ #1 is greater than the threshold. Therefore, the UE 1050 transmits packet data #2. As another example, the threshold is set to 0.9 as the UE 1050 considers that the packet data #1 is important. Then if the UE 1050 receives $ACK_{Node\ B}$ from the Node B 1020 and $NACK_{Node\ B}$ #1 from the Node Bs 1030 and 1040, the reliability of $ACK_{Node\ B}$ #1 is less than the threshold. Therefore, the UE 1050 retransmits the packet data #1.

As described above, the UE 1050 checks the reliability of transmitted packet data using weighting factors for ACK/NACK signals received from the Node Bs 1020, 1030 and 1040, and considers ACK/NACK information received from the RNC 1010 to be information indicating whether the ACK/NACK signals received from the Node Bs 1020, 1030 and 1040 are reliable or not.

Figure 11:
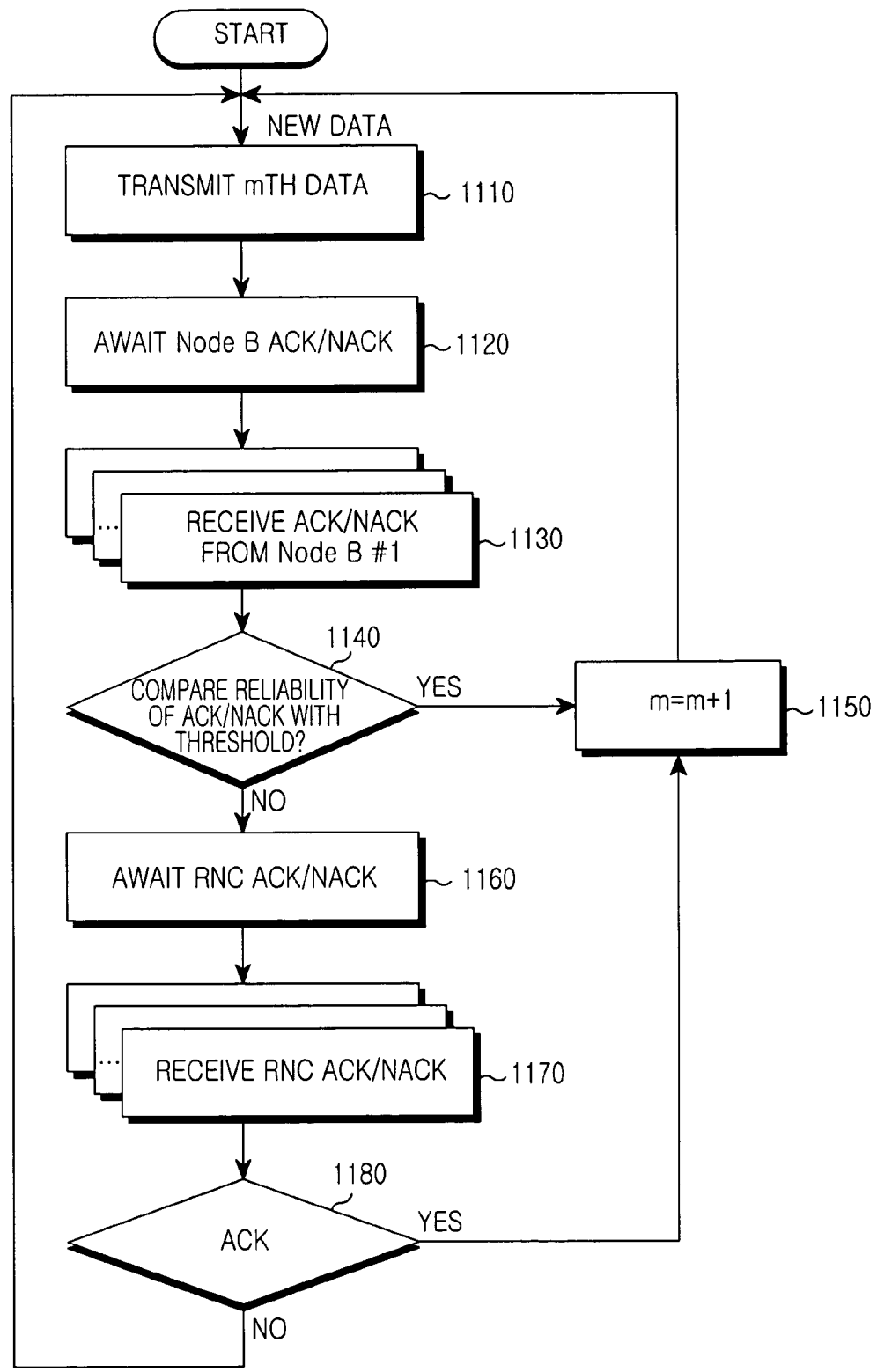
FIG. 11 is a flowchart illustrating an example of a control operation in the UE according to an embodiment of the present invention.

FIG. 11 is a flowchart illustrating an example of the control operation of a UE according to an embodiment of the present invention. For notational simplicity, the UE 1050 and the Node Bs 1020, 1030 and 1040 are used in the described example.

Referring to FIG. 11, the Node B 1050 enters a soft handover region covered commonly by the Node Bs 1020, 1030 and 1040 in step 1110. The UE 1050 transmits mth packet data to the Node Bs 1020, 1030 and 1040. The UE 1050 awaits reception of ACK/NACK signals for the mth packet data from the Node Bs 1020, 1030 and 1040 in step 1120 and receives ACK/NACK signals from the Node Bs 1020, 1030 and 1040 in step 1130. In step 1140, the UE 1050 compares the reliability of the ACK/NACK signals involving weighting factors assigned to the Node Bs with a target reliability, that is, a predetermined threshold. If the reliability of the ACK/NACK signals is greater than the threshold, the UE 1050 transmits (m+1)th packet data, assuming that the mth packet data has been transmitted reliably in step 1150. If the reliability of the ACK/NACK signals is less than the threshold, that is, the ACK/NACK signals are not reliable, the UE 1050 awaits reception of an ACK/NACK signal from the RNC 1010 in step 1160. The UE 1050 receives an ACK/NACK signal from the RNC 1010 in step 1170. If the signal is an ACK in step 1180, the UE 1050 transmits the (m+1)th packet data in step 1150. The ACK signal from the RNC 1010 results from space-diversity combining the mth packet data received from different paths from the Node Bs 1020, 1030 and 1040.

Since the ACK/NACK signal from the RNC 1010 is more reliable than those 30 from the Node Bs 1020, 1030 and 1040, the UE 1050 operates differently depending on the ACK/NACK signal received from the RNC 1010. In the case of the ACK signal from the RNC, the UE 1050 transmits the (m+1)th packet data, assuming that the mth packet data transmission is completed in step 1150. Here, the reliability of the ACK/NACK signal is computed in the UE 1050. For computation of the reliability, the UE 1050 uses weighting factors for the Node Bs 1020, 1030 and 1040. The weighting factors can be in proportion to SNRs involved with reception of the ACK/NACK signals. Or the reliability is determined to be a ratio of ACK to NACK signals within an effective signal range.

Due to the higher reliability of the RNC ACK/NACK signal than the Node B ACK/NACK signals, the UE 1050 does not decide the reliability of the RNC ACK/NACK signal. However, the UE 1050 may perform an additional operation for verifying the reliability of the RNC ACK/NACK signal as it is done for the Node B ACK/NACK signals.

In another embodiment of the present invention, the UE 1050 may set a threshold for the RNC ACK/NACK signal in step 1160 and unconditionally await reception of the RNC ACKlNACK signal in step 1170.

Figure 12:
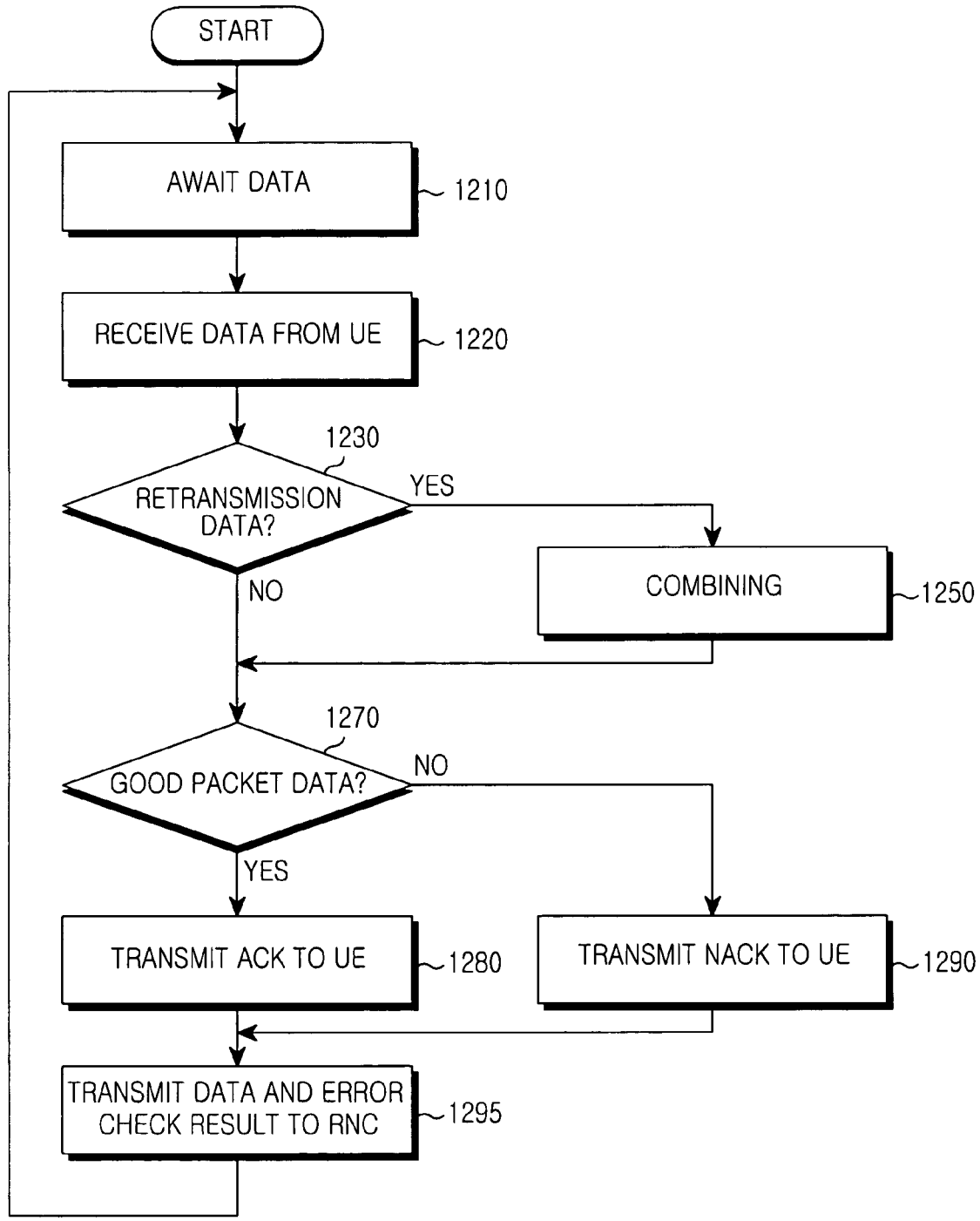
FIG. 12 is a flowchart illustrating an example of a control operation in a Node B according to an embodiment of the present invention.

FIG. 12 is a flowchart illustrating an example of the control operation of each of the Node Bs according to an embodiment of the present invention. Referring to FIG. 12, the Node B is placed in an idle state in step 1210 and receives the mth packet data from the UE on an EUDCH in step 1220. The Node B determines whether the packet data is an initial packet or a retransmitted packet by comparing the previous packet data stored in its memory with the received mth packet data in step 1230. In the case of an initial packet, the Node B checks errors in the packet data in step 1270. In the case of a retransmitted packet, the Node B soft-combines the received packet with the previous packet, increasing an error correction probability in step 1250, and then checks errors in step 1270. If no errors are found, the Node B transmits an ACK signal to the UE in step 1280 and the good mth packet data to the RNC in step 1295. If errors are found, the Node B transmits a NACK signal to the UE in step 1290 and the bad mth packet data to the RNC in step 1295.

Figure 13:
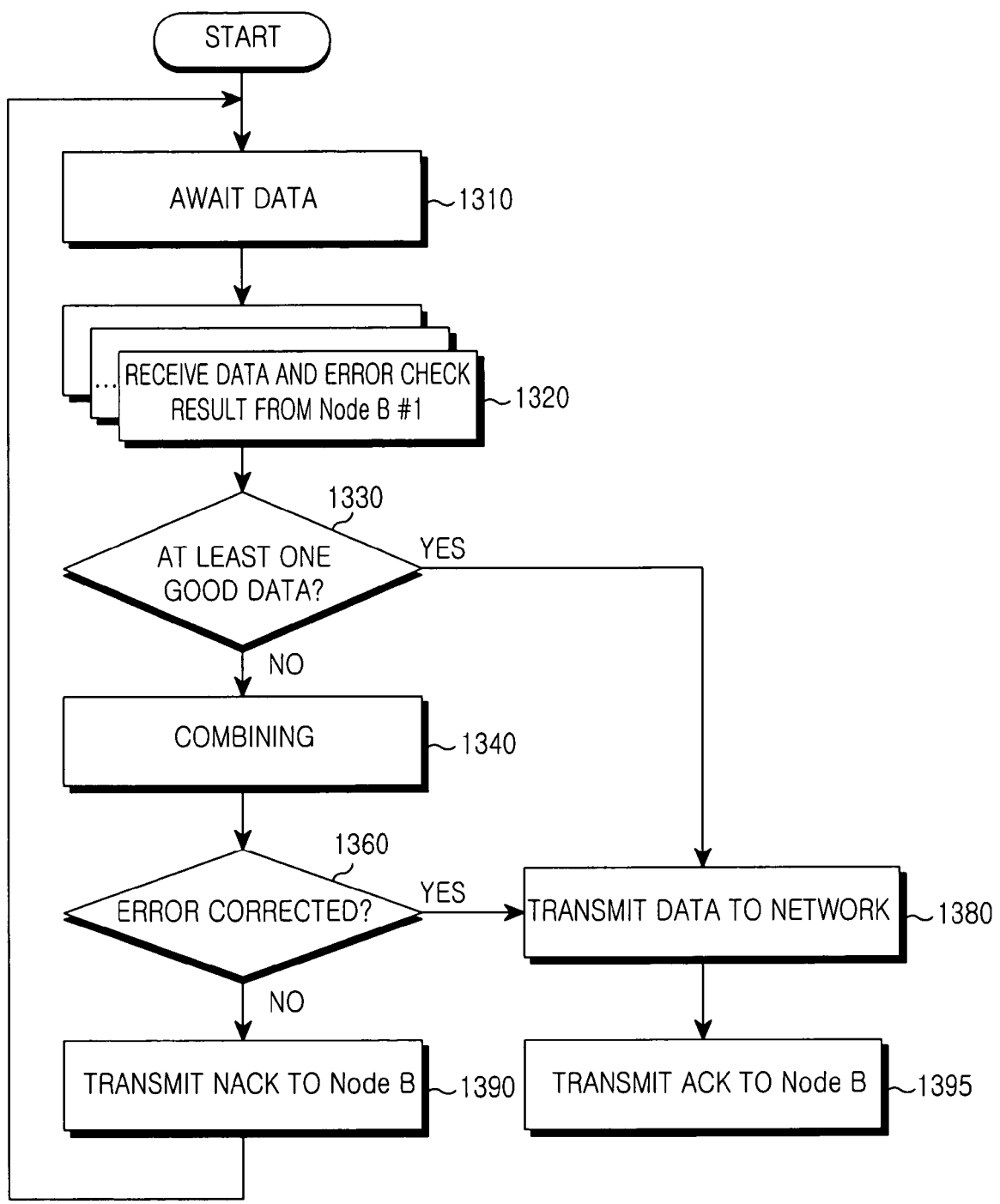
FIG. 13 is a flowchart illustrating an example of a control operation in an RNC according to an embodiment of the present invention.

FIG. 13 is a flowchart illustrating an example of the control operation of the RNC according to an embodiment of the present invention. Referring to FIG. 13, the RNC awaits reception of packet data from a plurality of Node Bs in step 1310. The RNC receives the mth packet data from the Node Bs in step 1320 and determines whether there is good packet data in step 1330. If the RNC finds good packet data in the received packet data, it transmits the mth packet data to the higher-layer network in step 1380 and transmits an ACK signal to the Node Bs in step 1395. If the received packet data is all bad, the RNC increases an error correction probability by space diversity-combining the received mth packet data in step 1340. After the RNC corrects errors in step 1360, it proceeds to step 1380. If the RNC fails to correct errors despite the space diversity-combining, it transmits a NACK signal to the Node Bs and requests retransmission of the mth packet data, assuming that the mth packet data cannot be recovered in step 1390.

Figure 14:
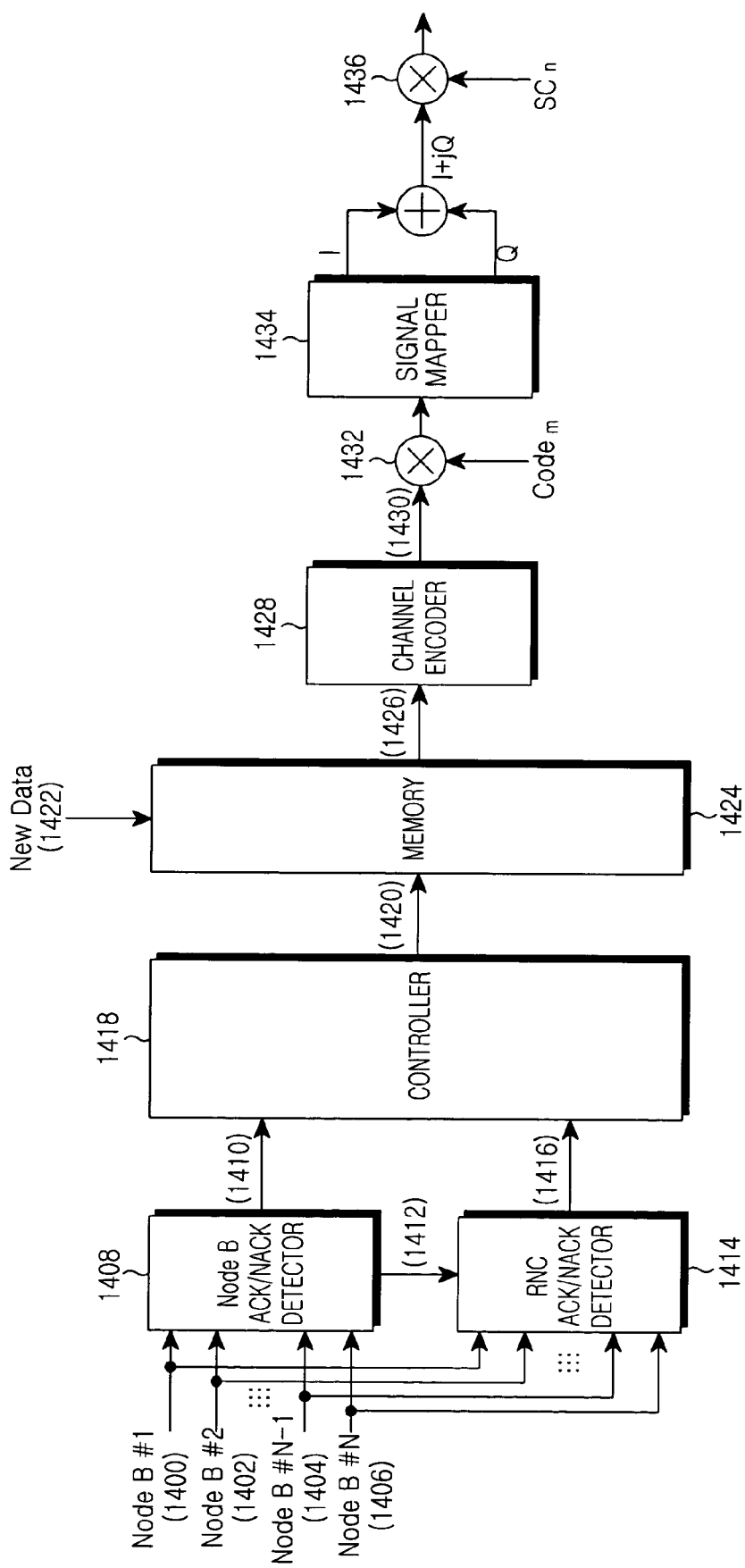
FIG. 14 is a block diagram illustrating an example of the UE according to an embodiment of the present invention.

FIG. 14 is a block diagram illustrating an example of the UE that performs the procedure of FIG. 11 according to an embodiment of the present invention. Referring to FIG. 14, the UE enters a soft handover region and transmits the mth packet data. The UE then receives $ACK_{Node\ B}$/$NACK_{Node\ B}$ signals 1400, 1402, 1404 and 1406 from a plurality of Node Bs that commonly cover the UE through a Node B ACK/NACK detector 1408. The Node B ACK/NACK detector 1408 determines whether at least one $ACK_{Node\ B}$ signal has been received and if it is reliable. If the $ACK_{Node\ B}$ signal is reliable, that is, its reliability is greater than a threshold, the Node B ACK/NACK detector 1408 transmits the $ACK_{Node\ B}$ signal to a controller 1418. The ACK/NACK detector 1408 may set an appropriate threshold that makes $ACK_{Node\ B}$ signals from the Node Bs reliable so that the controller 1418 operates based on $ACK_{RNC}$ information. An RNC ACK/NACK detector 1414 receives $ACK_{RNC}$/$NACK_{RNC}$ signals 1400 to 1406 transmitted to the Node Bs and transmits them to the controller 1418. Like the Node B ACK/NACK detector 1408, the RNC ACK/NACK detector 1414 determines whether an $ACK_{RNC}$ signal is reliable. If it is reliable, that is, its reliability is greater than a threshold, the RNC ACK/NACK detector 1414 transmits the $ACK_{RNC}$ signal to the controller 1418. The controller 1418 decides whether to retransmit packet data corresponding to ACK signals received from the Node B ACK/NACK detector 1408 and the RNC ACK/NACK detector 1414 must be retransmitted and what specific data to retransmit. That is, the controller 1418 controls a memory 1424 for retransmission of the mth packet data. If new data 1422 is to be transmitted, the controller 1418 assigns the new data 1422 to the memory 1424 and controls the memory 1424 to transmit the new data 1422. Uplink data 1426 output from the memory 1424 under the control of the controller 1418 is encoded in a channel encoder 1428, and spread by an mth spreading code in a spreader 1432. A symbol mapper 1434 maps the spread data to an I channel and Q channel. A scrambler 1436 scrambles the I and Q channel signals using a scrambling code $SC_n$. The resulting uplink data is then transmitted to the Node Bs.

Figure 15:
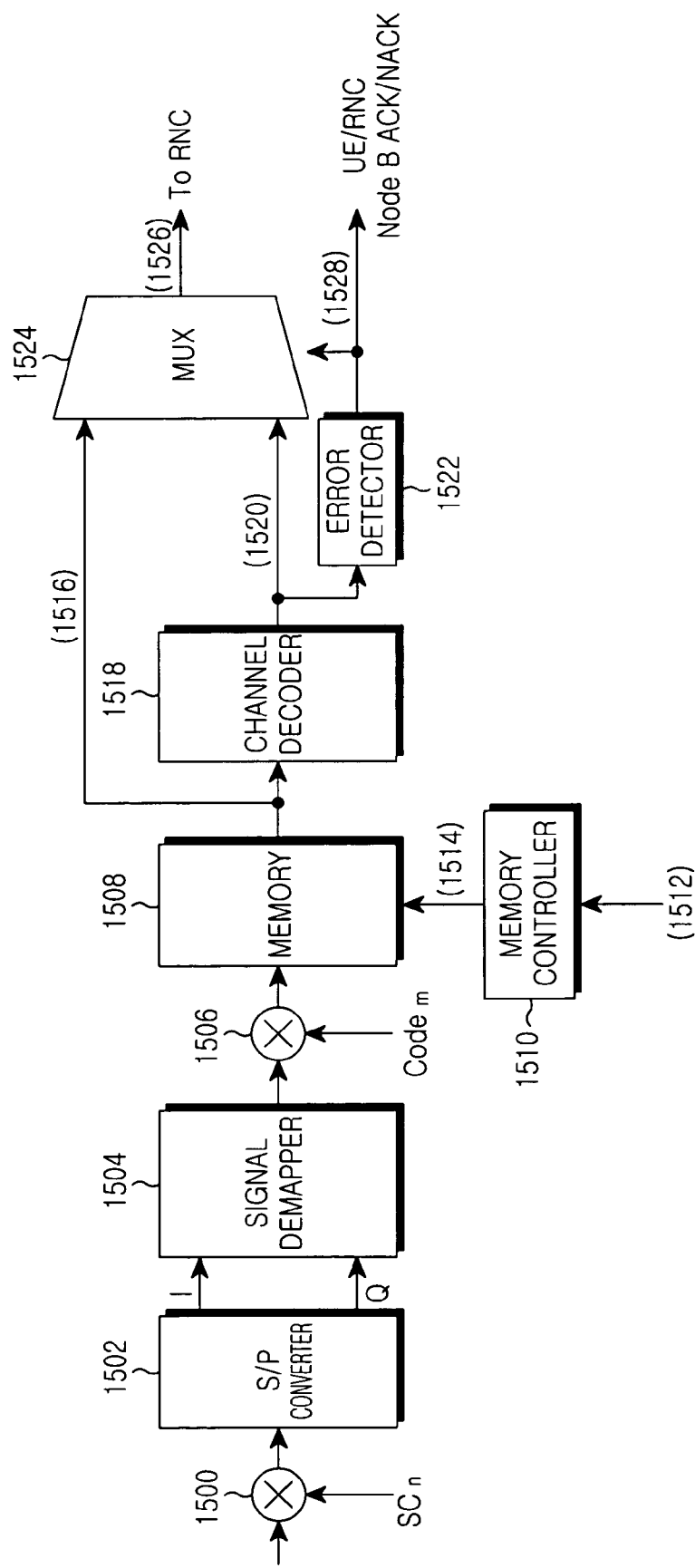
FIG. 15 is a block diagram illustrating an example of the Node B according to an embodiment of the present invention.

FIG. 15 is a block diagram illustrating an example of the Node B that performs the procedure of FIG. 12 according to an embodiment of the present invention. Referring to FIG. 15, each of the Node Bs receives EUDCH data from the UE. A descrambler 1500 descrambles the uplink data with the scrambling code $SC_n$. A serial-to-parallel (S/P) converter 1502 converts the descrambled signal to I- and Q-channel data streams. A symbol demapper 1504 demaps the data streams. A multiplier 1506 multiplies the I and Q channel data streams with an Orthogonal Variable Spreading Factor (OVSF) code, for chip rate-spreading. A memory 1508 stores the current packet data or soft-combines previous packet data with the current packet data depending on whether a new data indicator received from a memory controller 1510 indicates new data or retransmitted data. A channel decoder 1518 decodes the output of the memory 1508 and checks errors in the decoded data. An error detector 1522 decides whether the packet data has errors according to the error check result received from the channel decoder 1518. If errors are found, a multiplexer (MUX) 1524 transmits data 1516 without channel decoding as indicated, and an $NACK_{Node\ B}$ signal 1528, to the RNC, while the error detector 1522 transmits the $NACK_{Node\ B}$ signal 1528 to the UE. On the contrary, if the error detector 1522 determines that no errors exist in the packet data, the MUX 1524 transmits the channel-decoded data 1520 and an $ACK_{Node\ B}$ signal 1528 to the RNC, and the error detector 1522 also transmits the $ACK_{Node\ B}$ signal 1528 to the UE. The structure of the Node B illustrated in FIG. 15 is for one UE, the number of UEs that can be supported is variable depending on the reception performance of the Node B. The Node B can also be constituted in a different way according to the reception performance of the Node B.

Figure 16:
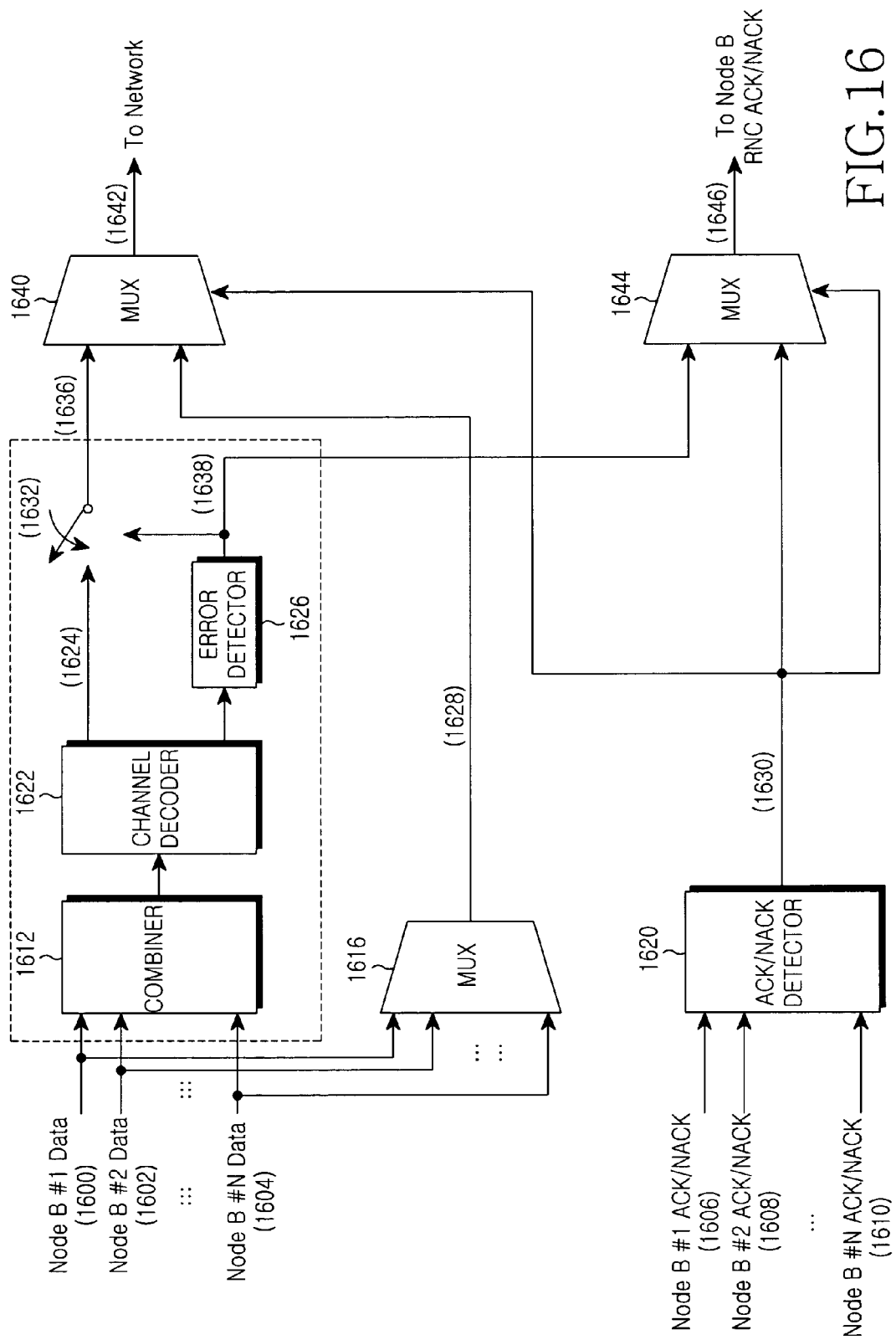
FIG. 16 is a block diagram illustrating an example of the RNC according to an embodiment of the present invention.

FIG. 16 is a block diagram illustrating an example of the RNC that performs the procedure illustrated in FIG. 13 according to an embodiment of the present invention. Referring to FIG. 16, an ACK/NACK detector 1620 determines whether at least one $ACK_{Node\ B}$ exists in received $ACK_{Node\ B}$/$NACK_{Node\ B}$ signals 1600 to 1604. If it does, the RNC transmits an $ACK_{RNC}$ signal to the Node Bs and the packet data from the Node B that transmitted the $ACK_{Node\ B}$ signal to the higher-layer network via MUXes 1616 and 1640. On the other hand, a combiner 1612 space-diversity combines the packet data received from the Node Bs that transmitted the $NACK_{Node\ B}$ signals. A channel decoder 1622 detects errors in the space diversity-combined packet data. If an error detector 1626 determines that there are errors in the packet data, a MUX 1644 transmits $NACK_{RNC}$ signals 1646 to the corresponding Node Bs, without switching packet data 1624 to the higher-layer network via a switch 1632. If the error detector 1626 determines that the packet data is good, the packet data 1624 is transmitted to the higher-layer network, while $ACK_{RNC}$ signals are transmitted to the Node Bs. As a result, the $ACK_{RNC}$ signals are delivered to the UE.

As described above, uplink data retransmission of a UE in a soft handover region is based on ACK/NACK signals from active Node Bs and an RNC, particularly it is performed by comparing the reliability of the ACK/NACK signals with a preset threshold. Therefore, the uplink data retransmission is reliably performed.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method of retransmitting uplink packet data from a user equipment (UE) to Node Bs, the UE being placed in a handover region commonly covered by the Node Bs and transmitting data to the Node Bs on an enhanced uplink dedicated transport channel (EUDCH) and a radio network controller (RNC) controls the Node Bs, the method comprising the steps of:

transmitting from the Node Bs to the UE first response fields indicating whether the Node Bs have received good packet data or bad packet data, and second response fields indicating whether the RNC has received good packet data or bad packet data; and detecting the first and second response fields and determining retransmission of the uplink packet data according to the values of the response fields in the UE.

2. The method of claim 1, wherein the first and second response fields transmitted from each of the Node Bs are successive or apart from each other, and are transmitted along with a downlink information field on one channel.

3. The method of claim 2, wherein the first and second response fields are transmitted on a dedicated transport channel supporting the EUDCH.

4. The method of claim 3, wherein the first and second response fields are transmitted in a field of a downlink dedicated physical data channel.

5. The method of claim 3, wherein the first and second response fields are transmitted in a field of a high-speed physical downlink shared channel.

6. An uplink data retransmitting system for a user equipment (UE) in a handover region in a Code Division Multiple Access (CDMA) communication system having a serving Node B, the UE within the coverage area of the Node B, a Node B adjacent to the serving Node B, and a radio network controller (RNC) connected to the Node B and the adjacent Node B, the UE transmitting uplink packet data to the serving Node B and the adjacent Node B on an enhanced uplink dedicated transport channel(EUDCH) and the handover region covered commonly by the serving Node B and the adjacent Node B, the system comprising:
 the Node B for receiving the uplink packet data from the UE in the soft handover region, deciding the value of a first response field indicating normal or erroneous reception of the uplink packet data, and transmitting the first response filed and a second response field received from the RNC to the UE;
 the RNC for deciding the value of the second response field indicating normal or erroneous reception of the uplink packet data and transmitting the second response field to the serving Node B and the adjacent Node B; and
 the UE for receiving the first and second response fields from the serving Node B and the adjacent Node B and determining retransmission of the uplink packet data according to the values of the first and second response fields.

7. The system of claim 6, wherein the first and second response fields transmitted from each of the serving Node B and the adjacent Node B are successive or apart from each other, and are transmitted along with a downlink information field on one channel.

8. The system of claim 7, wherein the first and second response fields are transmitted on a dedicated transport channel supporting the EUDCH.

9. The system of claim 8, wherein the first and second response fields are transmitted in a field of a downlink dedicated physical data channel.

10. The system of claim 8, wherein the first and second response fields are transmitted in a field of a high-speed physical downlink shared channel.

11. A method of retransmitting uplink packet data to a plurality of active Node Bs in a user equipment (UE) in a handover region in a mobile communication system supporting an enhanced uplink dedicated transport channel (EUDCH) service, the method comprising the steps of:
 receiving from the active Node Bs first response fields indicating normal or erroneous reception of the uplink packet data in the active Node Bs and second response fields indicating normal or erroneous reception of the uplink packet data in a radio network controller (RNC) connected to the active Node Bs;
 computing the reliability of the first response fields and comparing the reliability with a predetermined threshold; and
 transmitting a next uplink packet data if the reliability is greater than the threshold and determining retransmission of the uplink packet data depending on a second response field received from the RNC to the UE if the reliability is less than or equal to the threshold.

12. The method of claim 11, wherein the reliability is computed according to weighting factors assigned to the active Node Bs.

13. The method of claim 11, wherein the reliability is computed according to a ratio of different values of the first response fields.

14. The method of claim 11, wherein the UE sets the threshold so that the uplink packet data is retransmitted according to the value of the second response fields irrespective of the reliability of the first response fields.

15. A method of transmitting a response field indicating normal or erroneous reception of uplink packet data transmitted from a user equipment (UE) in a handover region in a radio network controller (RNC) connected to Node Bs that commonly cover the UE in a mobile communication system supporting an enhanced uplink dedicated transport channel (EUDCH) service, the RNC transmitting the response field, the method comprising the steps of:
 receiving the uplink packet data from the Node Bs, determining whether good uplink packet data is among the received packet data, and checking for errors after combining the received packet data if there is no good uplink packet data;
 deciding the value of the response field according to the error check result and transmitting the response field to the Node Bs; and
 transmitting the uplink packet data to a higher-layer network after correcting the errors of the uplink packet data.

16. A packet data transmitting apparatus for transmitting uplink packet data to a plurality of active Node Bs in a user equipment (UE) in a handover region in a mobile communication system supporting an enhanced uplink dedicated transport channel (EUDCH) service, comprising:
 a Node B response field detector for receiving downlink channels supporting the EUDCH from the active Node Bs and detecting first response fields indicating normal or erroneous reception of the uplink packet data in the active Node Bs;
 an Radio Network Controller (RNC) response field detector for receiving the downlink channels and detecting second response fields indicating normal or erroneous reception of the uplink packet data in an RNC connected to the active Node Bs; and
 a controller for deciding whether to retransmit the uplink packet data according to the first and second response fields, selecting uplink packet data to be retransmitted, and controlling a memory to transmit the selected uplink packet data.

17. A transmitting apparatus for transmitting a response field indicating normal or erroneous reception of uplink packet data transmitted from a user equipment (UE) in a handover region in a radio network controller (RNC) connected to active Node Bs that commonly cover the UE in the handover region, the UE retransmitting the uplink packet data according to the value of the response field, in a mobile communication system supporting an enhanced uplink dedicated transport channel (EUDCH) service, comprising:
 a Node B response field detector for detecting response fields indicating normal or erroneous reception of the uplink packet data in the Node Bs;
 a combiner for combining the uplink packet data received from the Node Bs and checking errors in the combined uplink packet data; and
 an error detector for checking errors in the uplink packet data, generating the response field according to the error check result, and outputting the generated response field for transmitting to the Node Bs.

18. The apparatus of claim 17, wherein the combiner performs space diversity-combining on the received uplink packet data.

* * * * *